INVENTORS.
WALTER S. BUSLIK
RALPH E. MARRS
BY Nathan N. Kallman
Attorney

United States Patent Office 3,566,381
Patented Feb. 23, 1971

3,566,381
DATA STORAGE MEANS HAVING BOTH FIXED AND REMOVABLE RECORD DISK MEANS

Walter S. Buslik, San Jose, and Ralph E. Marrs, Campbell, Calif., assignors to International Business Machines Corporation, Armonk, N.Y., a corporation of New York

Filed Sept. 15, 1967, Ser. No. 667,941
Int. Cl. G11b *3/36, 17/26, 19/22*
U.S. Cl. 340—174.1 12 Claims

ABSTRACT OF THE DISCLOSURE

A device for moving a carrier employs perpendicularly disposed shafts, one carrying a flexible disk and the other spaced wheels. A carriage is mounted to one of the shafts, which is threaded, and, when one of the wheels is made to contact the flexible disk, the carriage is transported in a desired direction. When used in a random access magnetic disk file, the carriage supports at least one magnetic head assembly for bidirectional movement relative to the magnetic record disk. The disk file disclosed herein uses a fixed magnetic disk and a removable, replaceable magnetic disk, both seated to the same spindle assembly.

BACKGROUND OF THE INVENTION

Field of the invention

This invention relates to an actuator and positioning device and in particular to a magnetic head carrier actuator useful in a magnetic disk file having both fixed and removable magnetic disk means.

Description of the prior art

There is a continuous need for devices wherein an accessing element is rapidly moved to a selected position and brought to rest, and then rapidly moved again to another selected position or retracted. For example, in presently known magnetic disk data storage apparatus, a carrier supporting a magnetic head assembly is actuated rapidly to a selected sector and track of a magnetic disk in order to record or read out data. With present day technology, the data signal is preferably recorded with high density on narrow concentric tracks. Precise positioning and control of the carrier and magnetic head assembly are necessary. In addition, rapid access to the desired sector and track is required to make optimum use of the disk store which generally is coupled to an extremely rapid data processing apparatus, such as a computer, by way of example. Several forms of accessing devices have been proposed heretofore, but these known devices are relatively complex and expensive to manufacture and maintain.

SUMMARY OF THE INVENTION

An object of this invention is to provide a novel data storage means having both fixed and removable record disk means.

Another object of this invention is to provide a novel and improved actuator and positioning device that affords rapid access and precise positioning of one element relative to another element.

Another object of the invention is to provide a data disk file wherein a magnetic head assembly is driven bidirectionally for rapid access to any location of a magnetic disk.

Another object is to provide a magnetic disk assembly incorporating a plurality of disks that bear a similar positional relationship to a magnetic head assembly having a plurality of transducers, whereby a common drive may be employed for all of the transducers.

According to this invention, an actuator and positioning device comprises a carriage that is mounted to a threaded portion of a longitudinal shaft or lead screw. A drive shaft is disposed adjacent to the threaded shaft so that the axes of the shafts are substantially perpendicular to each other. A flexible disk is fastened to one of the two shafts, while the other shaft carries a pair of wheels or tires, spaced apart for a distance less than the diameter of the flexible disk. By selection means, a first one of the rotating tires is frictionally engaged with the flexible disk, thereby imparting rotary motion to the threaded shaft and longitudinal drive to the carriage in one direction at a controlled speed. Engagement of the second tire with the flexible disk, while the first tire is disengaged, results in drive of the carriage in the opposite direction, also at a controlled speed. To stop the carriage travel at a desired location, the engaged tire is released from the flexible disk and detent means are actuated.

In a particular application of the invention wherein a disk file incorporates the inventive actuator and positioning device, a magnetic head assembly is attached to the carriage for radial motion relative to a magnetic disk means. The disk means has a multiplicity of concentric tracks on which data is recorded and subsequently read out by the transducing means of the magnetic head assembly. By means of the actuator and positioning device disclosed herein, rapid access of the head assembly to a precise location of a selected sector and track of the magnetic disk means is made possible.

A feature of the disk file disclosed herein is the use of a fixed magnetic disk and a removable, replaceable magnetic disk, both seated to the same spindle assembly. The removable disk is housed in a removable cartridge, thereby enabling rapid and facile replacement and offline storage.

BRIEF DESCRIPTION OF THE DRAWINGS

The foregoing and other objects, features and advantages of the invention will be apparent from the following more particular description of preferred embodiments of the invention, as illustrated in the accompanying drawings in which.

Similar numerals refer to similar elements throughout the drawing.

DESCRIPTION OF THE PREFERRED EMBODIMENTS

Figure 1:
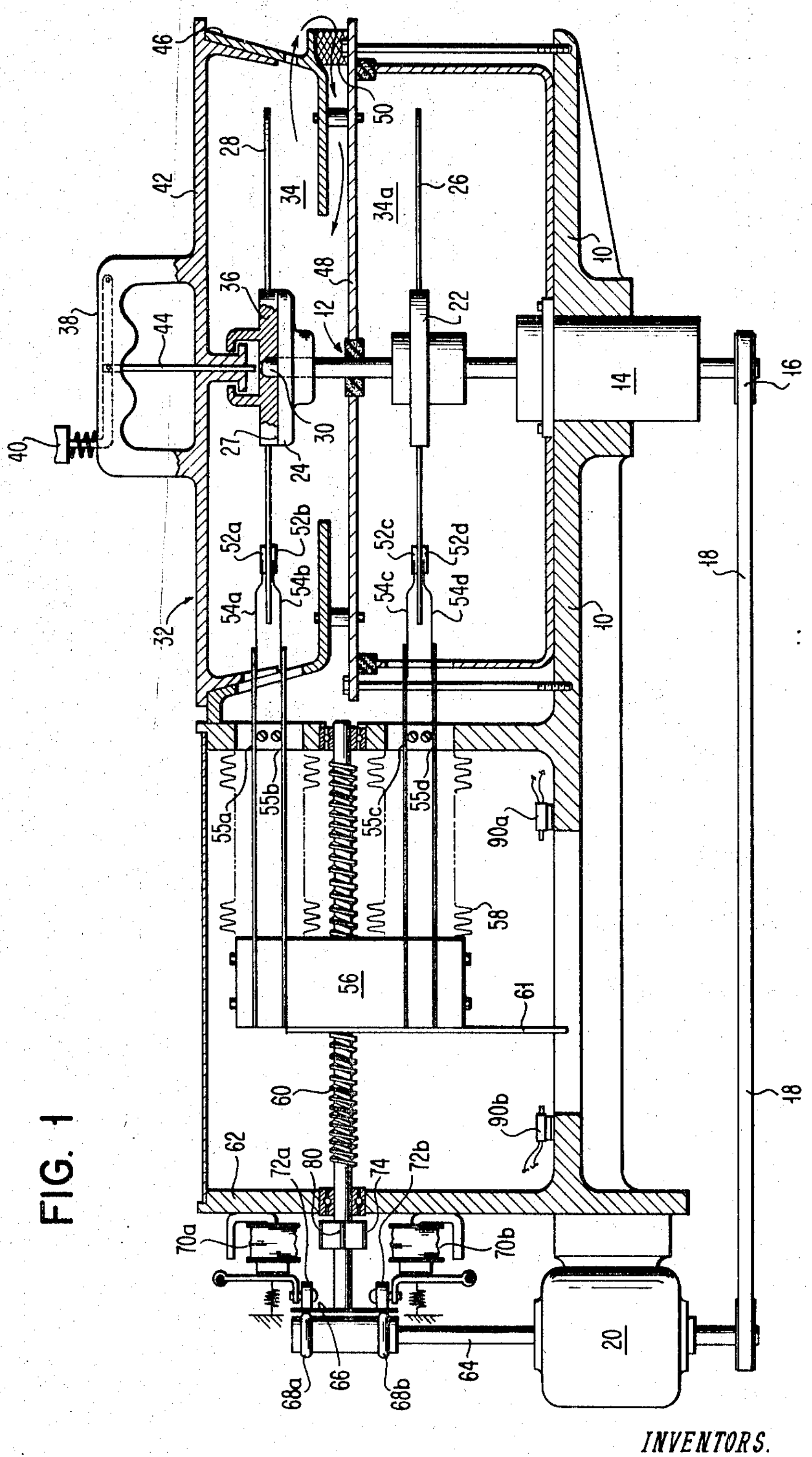
FIG. 1 is a sectional side view of a magnetic disk file, incorporating the instant invention.
Figure 2:
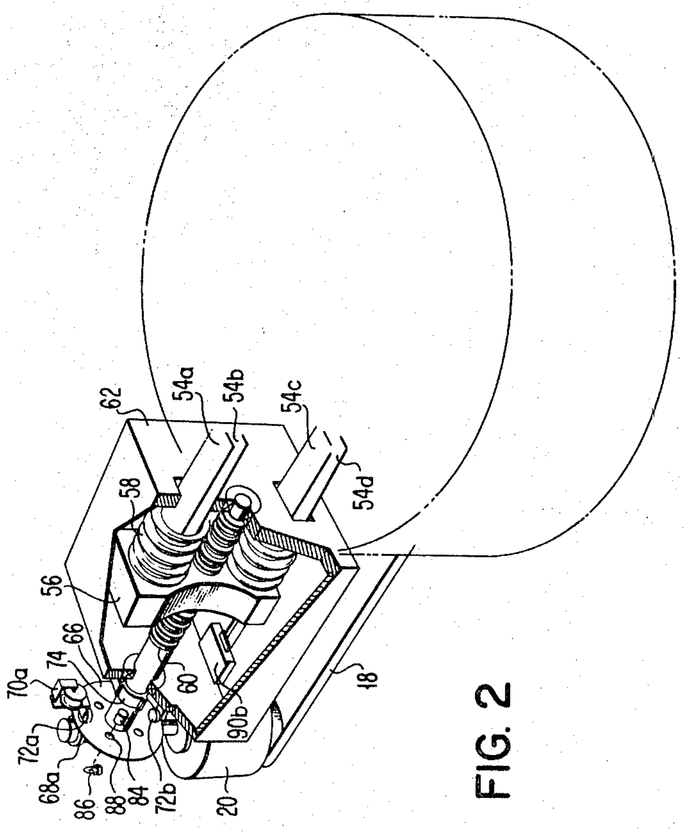
FIG. 2 is an isometric view, partly broken away, of the novel disk file depicted in FIG. 1.

With reference to FIGS. 1 and 2, a magnetic disk file assembly comprises a base plate 10 on which is mounted a spindle assembly 12 supported by a bearing housing 14, that is bolted to the base plate 10. At the lower end of the spindle 12 is a pulley 16 that is driven by a belt 18, which in turn is driven by a motor 20. Above the base plate 10 are two flanges 22 and 24. A fixed magnetic disk 26 is clamped to the lower flange 22 while the upper flange 24 carries a magnetic chuck 27. A removable disk assembly 28 is located on a tapered section 30 at the end of spindle 12, and the magnetic chuck 27 effectively clamps the removable disk assembly 28. For a detailed description of the operation of such magnetic holding device in combination with a removable disk assembly, as utilized herein, reference is made to U.S. Pat. No. 3,304,527 entitled "Magnetic Holding and Aligning Device," assigned to the same assignee. Briefly, the device disclosed in such patent utilizes a permanent magnet for holding a disk assembly to a rotary spindle in secure, but detachable relation. A magnetic shunt overcomes the problem of spurious erasure of data recorded on the disk.

The removable disk 28 is contained in a cartridge 32 which forms the top of the sealed disk enclosure 34 of the data file. A hub 36 is clamped to the inner circumference of the removable disk 28, and this hub locates on the tapered end 30 of the spindle 12 where it is retained by the magnetic chuck 27. Accurate assembly of the hub 36 and disk 28 ensures concentricity on the spindle 12.

The disk 28 is removable from the spindle 12 by means of a handle 38 and a release mechanism or key 40, formed as part of the cartridge cover 42. When the release key 40 is depressed, a connecting arm 44 pushes against the tapered end 30 of the spindle 12. An upward pull of the handle 38 overcomes the force of attraction between the magnetic chuck 27 and the magnetic hub 36, to which the disk 28 is relatively fixed. The entire assembly, including the cartridge cover 42, the hub 36 and disk 28 is lifted away from the enclosure wall 46 for off-line storage, and replacement by an identical disk assembly.

Since removal of the disk cartridge 32 exposes the enclosure 34 to ambient conditions, a seal cover 48 maintains the fixed disk 26 in a separate enclosure **34*a* to avoid the entry of dust and foreign particles, which may lead to data dropout and loss in the magnetic recording and playback process. Also, when the cartridge 32 and removable disk assembly 28 are assembled to the disk file, air is circulated through a filter 50 and through the enclosure 34** to provide a clean, dust-free atmosphere.

To achieve recording or readout of the magnetic disks 26 or 28, magnetic transducers or heads **52*a*, *b*, *c*, *d* are provided. The specific circuitry for energization of a selected transducer 52 for the read, write, and erase functions, and the associated head components are not illustrated further, since such structures are well known. The transducers 52*a*, *b*, *c*, *d* are mounted to respective carrier arms 54*a*, *b*, *c*, *d* which are fastened to a carriage 56. The carrier arms 54*a* and 54*b* pass through slots 55*a*, *b*, in the enclosure wall 46 into the enclosure 34, while the carrier arms 54*c* and 54*d* project through a bellows 58 and through slots 55*c*, *d*, into the enclosure 34*a*. The bellows 58 serve to prevent contamination of the head assemblies 52*c*, *d* and of the magnetic disk 26**.

The carrier arms 54 are aligned and the transducers 52 loaded so that the transducers **52*a* and 52*b* are in proper transducing relation with opposite sides of the removable disk 28, while transducers 52*c* and 52*d* are in proper transducing relation with opposite sides of the fixed disk 26**, respectively.

During operation of the disk file apparatus, the head asemblies or transducers 52 are all moved together by means of the carriage 56, under control of an actuator and positioning device, in keeping with this invention, to a desired location referenced to track positions of the magnetic disks 26 and 28. When properly positioned, one or more of the magnetic transducers may be energized for record or readout of its associated disk surface.

To accomplish the actuation and accurate positioning of the head assemblies, the carriage 56 is mounted to a threaded shaft or lead screw 60 for bidirectional travel along the axis of the shaft. The shaft 60 is supported in a fixed frame 62 and is disposed in substantially parallel relation to the plane defined by the magnetic disks 26 and 28. When the shaft 60 is rotated, the carriage 56, which contains a nut that is coupled to the threads of the shaft, slides along the threaded portion of the shaft 60. To prevent rotation of the carriage, a bracket 61 that is secured to a wall of the carriage assembly rides in a slot as the carriage is transported. The direction and amount of rotation of the shaft 60 determines the linear direction and amount of travel, forward or reverse, of the carriage 56 and accordingly of the carrier arms 54 and transducers 52.

In order to drive the lead screw or shaft 60, a drive shaft 64 is positioned closely adjacent to one end of the lead screw with the axis of the shaft 64 substantially perpendicular to the longitudinal axis of the screw. The drive shaft 64 is powered, directly or indirectly, by the constantly operating drive motor 20, which also serves to supply rotary power to the spindle 12 of the disk file. A flexible disk 66, made of stainless steel, for example, is attached to the end of the lead screw 60, while two spaced wheels or tires **68*a* and 68*b* are secured to the drive shaft 64. The tires 68 are spaced at a distance less than the diameter of the flexible disk 66, and are preferably positioned so that the tires are approximately adjacent to the peripheral area of disk 66**.

In operation, when a command is provided from a keyboard, or from a computer or other processing unit, for movement of the head assemblies from one track to another, the actuator and positioning apparatus of this invention is activated. To this end, the disk 66 is engaged with one of the tires 68 by energizing one of two electromagnets **70*a* or 70*b*, in accordance with the direction of travel required for the magnetic head assemblies. Let us assume that electromagnet 70*a* affords forward travel or movement radially inboard of the magnetic disks and the electromagnet 70*b* provides reverse movement, radially outward relative to the disks. When a selected electromagnet 70 is energized a respective pressure roller 72*a* or 72*b* is actuated to force the portion of the disk 66 adjacent thereto into contact with the associated tire 68. As the tire 68 rotates with the drive shaft 64, rotary motion is imparted to the flexible disk 66 and to the lead screw or shaft 60. As a result, the carriage 56 and attached transducer carriers 54 are moved in a linear direction prescribed by the rotary direction of the disk 66. The linear velocity of the carriage 56 is dependent upon the drive motor speed and the pitch of the threaded portion of the lead screw 60**, inter alia.

When the head assembly arrives at the proper position, rotation of the lead screw 60 and travel of the carriage 56 are halted substantially instantaneously. At first, a signal derived from a central processing unit de-energizes the energized magnet 70 whereby the pressure roller 72 is retracted by a spring from the flexible disk 66, which becomes disengaged from the tire 68.

Figure 3:
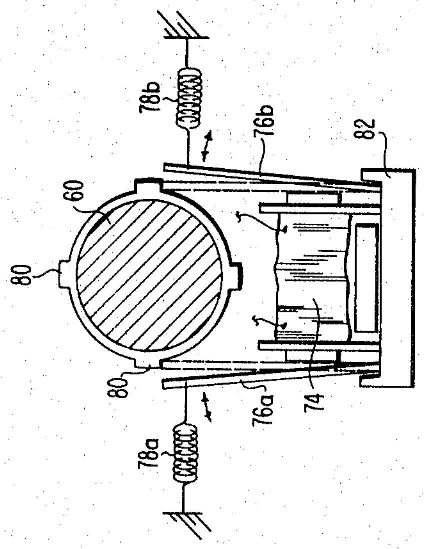
FIG. 3 is a detailed view of the detent mechanism employed with the present invention.

To brake the screw 60 to a complete stop, a detent means, such as illustrated in FIG. 3, is used. For detenting action, an electromagnet 74 is energized, thereby attracting a pair of spring loaded magnetic arms or pawls **76*a*, *b* inwardly against the tension or outward pull of a pair of return springs 78*a*, *b*, tied to the arms 76*a*, *b*. The rigid arms 76 pivot to a detent position such that their free ends are located closely adjacent to the surface of the still-rotating lead screw 60. In such position, the arms 76 are spaced substantially by the diameter of the screw 60**.

The screw 60 has a plurality of detent keys 80 (shown as four keys in this embodiment, by way of example) that are equally spaced around the circumference of the screw. When the arms 76 are in detent position, one projecting key 80 strikes the end of one arm to stop the rotary movement of the screw. The impact of the key on the arm is absorbed by a spring support 82, to which the arms 76 are mounted, and the energy that was transmitted to the arm is dissipated. Also, a small opposite torque or reaction to the force applied to the arm is developed, and the screw 60 tends to reverse direction of rotation. However, the arm 76 opposite to the arm that was first struck blocks the projecting key 80 that is diametrically opposite to the first striking key, and thus counter-rotation of the screw is prevented. When the lead screw 60 is at rest and the keys 80 are in detent position, the magnetic transducers 52 are located on a selected track of the associated magnetic disk.

It should be understood that the detent assembly may be in another form than that described above. For example, a common spring may be attached between the arms 76a and 76b tending to pull the arms inwardly to detent position. In such case, an electromagnet is coupled to each arm to retract the arm when energized. Furthermore, logic may dictate that detenting should occur in the absence of a pulse, in lieu of the presence of a pulse. Thus, the presence of a pulse allows rotation of the shaft 60.

To ensure that the head assembly travels to the correct track of the magnetic disk that is to be scanned, a rotary sensing means is coupled to the rotating threaded shaft 60 to measure the number of revolutions or fraction thereof made by the shaft 60. In this embodiment, the flexible disk 66 is apertured and disposed between a fixed photocell 84 and a light source 86. The flexible disk 66 has four apertures 88 that are in angular alignment with the detent keys 80, as illustrated in FIG. 2.

In this particular embodiment, when driving the head assembly to a desired track by rotation of the lead screw 60, the head assembly is moved one track radially for each 90 degrees or one-quarter turn of the lead screw. The apertures 88 of the rotating flexible disk 66 pass radiation from the light source 86 to the photoelectric cell 84 to develop a count indicative of the number of quarter turns made by the screw 60, which corresponds to the number of magnetic disk tracks that have been traversed. In other words, for each 360° rotation of the timing drive disk 66, a distance substantially equivalent to the radial distance across four tracks of the magnetic disk is traveled by the head assembly. Thus, the count of the tracks that are passed by the magnetic head assembly is duplicated by the count of the apertures that pass the photosensing means.

When the desired count is reached, the electromagnet 70 that was energized to cause flexing of the drive disk 66 is de-energized, while the detent electromagnet 74 is energized. As a result, the carriage 56 is halted so that the head carriers 54 and transducers 52 are in proper alignment with the track to be scanned. When the head assembly is "on track," the lead screw 60 and timing and drive disk 66 are angularly positioned so that the fixed photosensing means 84 is intermediate two adjacent apertures 88. This occurs since a finite interval, about a few milliseconds for example, is needed for stopping the drive mechanism, after the counter circuitry has determined that the number of apertures which were sensed corresponds to the number of tracks that were to be traversed.

To provide fail-safe operation by assuring that the driven shaft 60 will not rotate further whenever the carriage 56 arrives at either end of the threaded portion of the shaft 60, spaced limit switches 90a and 90b are provided. An extension 92 attached to the carriage 56 trips the microswitch 90a or 90b to de-energize the respective drive electromagnet 70a or 70b. Simultaneously, the detent electromagnet 74 is energized by the closing of either microswitch 90a or 90b to stop rotation of the shaft 60. Whenever the head assembly is to be moved again after coming to rest, the detent mechanism is released and a selected drive electromagnet 70 is energized.

Figure 4:
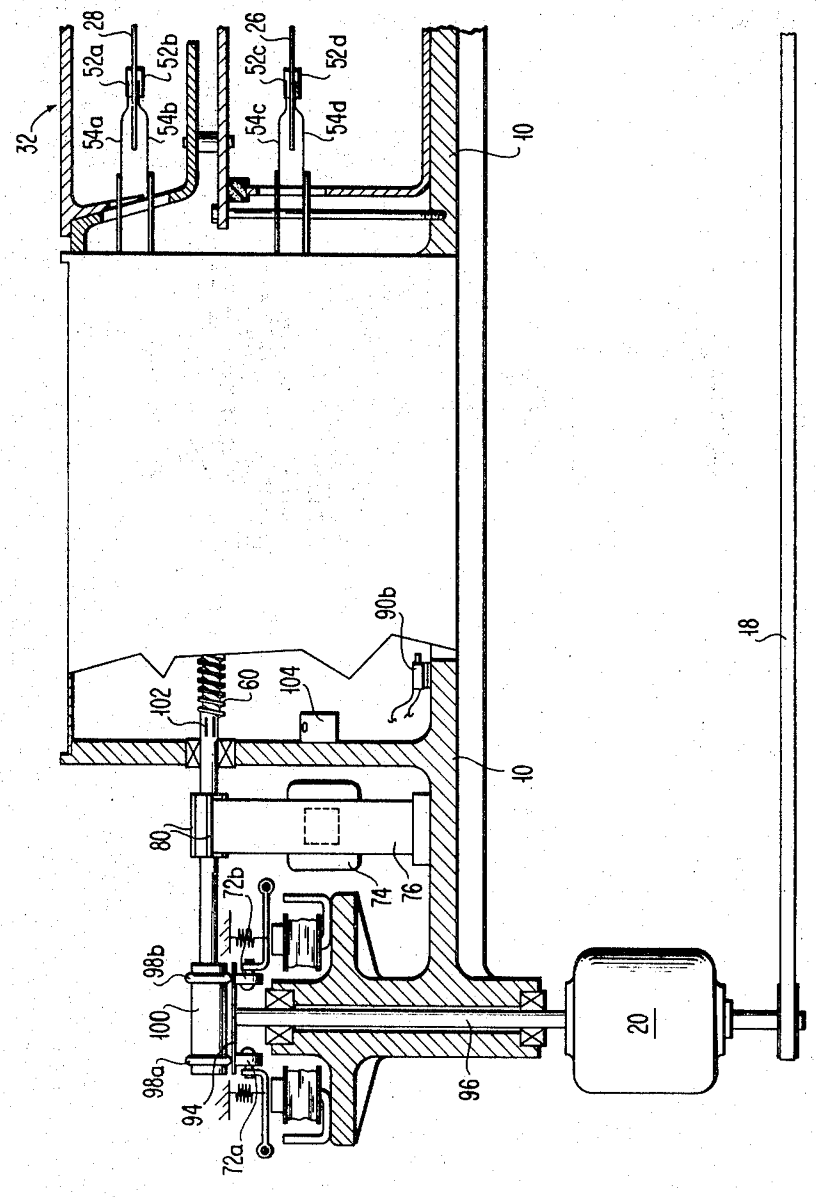
FIG. 4 is a side view, partially in section, of an alternative embodiment of the actuator and positioning device used in this invention.

FIG. 4 depicts an alternative embodiment of the invention wherein a flexible drive disk 94 is mounted to a drive shaft 96 and drive tires 98a, b are mounted to a driven shaft 100. Operation of the alternative actuator configuration is substantially similar to that embodied in FIG. 1. FIG. 4 further presents an alternative rotary sensing means in the form of light reflecting photomarkers 102 disposed on the driven shaft 100, which cooperate with a photosensing system 104 that includes a fixed light source and photosensor or photoelectric cell. Radiation from the light source is reflected from the photomarkers 102 and monitored by the photoelectric cell to develop a count of fractional turns of the driven shaft 100, which is nonreflecting. Also, the driven shaft 100 may be a reflecting surface, and the markers may be formed as blackened nonreflecting areas, and the photoelectric cell output arranged so that the absence of reflected light develops a signal. It is apparent that other sensing means, such as a combination of magnetic markers and detector heads, may be used for the same purpose.

The circuits for selection and energization of the electromagnets and transducers, and for counting the shaft revolutions and comparing same to the instruction count, as used in this invention, are not illustrated or described in detail, since such circuits are well known in the art and further elaboration is not deemed necessary for explanation and understanding of this invention.

There has been described herein an actuator and positioning device having a reversible clutch assembly that affords rapid and precise direct access of a magnetic head to radially aligned, concentric tracks of a magnetic disk in a disk file. The disk file employs a fixed magnetic disk assembly and a removable disk assembly, both clamped to the same spindle, and both accessed by means of the same head carriage. Furthermore, the actuator and positioning device are also coupled to the same drive as the spindle for bidirectional drive of the magnetic head, whereby savings in cost and space, among other things, are realized.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Data storage apparatus comprising:
- a mounting means;
- a fixed record disk means permanently secured to said mounting means and enclosed in an enclosure;
- a removable record disk means in a disk cartirdge having a connecting means for attaching and detaching said removable record disk means to and from said mounting means, and to and from said data storage apparatus said removable record disk means being in a co-axial relationship with said fixed record disk means when connected to said mounting means;
- carrier means for simultaneously accessing both said fixed record disk means and said removable record disk means; and
- record sensing means supported on said carrier means for performing transducer functions simultaneously to both said fixed record disk means and said removable record disk means.

2. Data storage apparatus comprising:
- a fixed record disk means within a first enclosure;
- a removable disk means being secured in a sealed cartridge;
- means for mounting said fixed record disk means and said removable record disk means co-axially;
- carrier means for accessing said fixed record disk means and said removable record disk means; and
- record sensing means supported on said carrier means for transferring intelligence to and from both said fixed record disk means and said removable record disk means.

3. Data storage apparatus as in claim 2, wherein said disk means are magnetic, and said sensing means comprises separate magnetic transducers for cooperating respectively with said magnetic disk means in transducing relationship.

4. Data storage apparatus as in claim 2, wherein said mounting means comprises a common spindle.

5. Data storage apparatus as in claim 4, wherein said spindle and carrier means are powered by a single motor.

6. Data storage apparatus comprising:
spindle means;
magnetic disk means for storing data signals along a multiplicity of concentric tracks on said magnetic disk means, said magnetic disk means comprising a first disk within a first enclosure that is permanently secured to said spindle means for rotation therewith, and a second disk, within a sealed cartridge having a connecting means for securing and removing said second disk to and from said spindle means and to and from said data storage means, said first and second disks being parallel to each other;
a threaded longitudinal shaft disposed substantially orthogonally to said spindle means and substantially parallel to said magnetic disk means;
a carriage mounted to said longitudinal shaft for bidirectional movement along the shaft;
magnetic transducing means coupled to said carriage;
drive means for urging said carriage to move along the longitudinal shaft to simultaneously position said transducing means with reference to a selected track on both said first and second disks, said drive means including reversible clutch means for providing bidirectional movement of said carriage.

7. Data storage apparatus as in claim 6, including first and second arms fixed to said carriage, and said magnetic transducing means comprises a plurality of magnetic transducers secured to each of said carriage arms for radial movement relative to said disks.

8. Data storage apparatus as in claim 7, wherein said carrier arms are bifurcated, and each arm supports magnetic transducers for scanning both surfaces of each disk.

9. Data storage apparatus as in claim 6, wherein said drive means comprises a motor for providing a driving force simultaneously to said spindle and to said longitudinal shaft.

10. Data storage apparatus as in claim 9, including a drive shaft coupled to said motor; and wherein said reversible clutch means comprises a flexible disk mounted to said longitudinal shaft, and a plurality of wheels mounted to said drive shaft.

11. Data storage apparatus as in claim 10, including means for selectively engaging one of said wheels with said flexible disk to cause rotation of said longitudinal shaft; and detent means for preventing rotation of said longitudinal shaft when said wheels are disengaged from said disk.

12. Data storage apparatus as in claim 11, including means for sensing the angular registration of said longitudinal shaft during rotation thereof.

References Cited

UNITED STATES PATENTS

| | | | |
|---|---|---|---|
| 2,027,844 | 11/1936 | Skolfield | 74—202 |
| 2,750,810 | 6/1956 | Jungjohann et al. | 74—202 |
| 2,825,426 | 3/1958 | Baxter, Sr. | 188—69 |
| 2,938,606 | 5/1960 | Passman | 188—69 |
| 2,981,388 | 4/1961 | Peres | 188—69 |
| 3,021,512 | 2/1962 | Welsh et al. | 340—174.1 |
| 3,124,789 | 3/1964 | Wasyienko | 340—174.1 |
| 3,130,393 | 4/1964 | Gutterman | 340—174.1 |
| 3,183,516 | 5/1965 | Sliter | 340—174.1 |
| 3,191,164 | 6/1965 | Lekas | 340—174.1 |
| 3,424,872 | 1/1969 | Whitcock et al. | 179—100.2 |
| 3,156,906 | 11/1964 | Cummins | 340—174.1 |
| 3,206,214 | 9/1965 | Leary | 340—174.1 |
| 3,474,427 | 10/1969 | Stevens, Jr. | 340—174.1 |

BERNARD KONICK, Primary Examiner

V. P. CANNEY, Assistant Examiner

U.S. Cl. X.R.

74—202; 189—69; 274—41.4